(12) United States Patent
Huang et al.

(10) Patent No.: US 10,715,982 B2
(45) Date of Patent: Jul. 14, 2020

(54) METHOD, APPARATUS, AND SYSTEM FOR DATA TRANSMISSION

(71) Applicant: ZTE CORPORATION, Guangdong (CN)

(72) Inventors: Meiqing Huang, Guangdong (CN); Qian Dai, Guangdong (CN); Yuanfang Yu, Guangdong (CN); Yin Gao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 172 days.

(21) Appl. No.: 16/074,051

(22) PCT Filed: Nov. 16, 2016

(86) PCT No.: PCT/CN2016/106013
§ 371 (c)(1),
(2) Date: Jul. 30, 2018

(87) PCT Pub. No.: WO2017/133297
PCT Pub. Date: Aug. 10, 2017

(65) Prior Publication Data
US 2019/0045341 A1    Feb. 7, 2019

(30) Foreign Application Priority Data

Feb. 4, 2016   (CN) .......................... 2016 1 0081306

(51) Int. Cl.
*G06F 15/173* (2006.01)
*H04W 4/70* (2018.01)
*H04L 12/24* (2006.01)

(52) U.S. Cl.
CPC ............ *H04W 4/70* (2018.02); *H04L 41/0803* (2013.01); *H04L 41/0823* (2013.01)

(58) Field of Classification Search
CPC ... H04W 4/70; H04L 41/0803; H04L 41/0823
USPC ........................................................ 709/223
See application file for complete search history.

(56) References Cited

U.S. PATENT DOCUMENTS

2006/0106924 A1* 5/2006 Fukasawa ............... H04L 67/06
709/223

FOREIGN PATENT DOCUMENTS

CN     102271367 A     12/2011
CN     103227704 A     7/2013

OTHER PUBLICATIONS

Extended European Search Report dated Jan. 7, 2019, in corresponding European Patent Application No. 16889104.2.
(Continued)

*Primary Examiner* — Wing F Chan
*Assistant Examiner* — Joseph R Maniwang
(74) *Attorney, Agent, or Firm* — Duane Morris LLP

(57) ABSTRACT

A method, apparatus, and system for data transmission, wherein the method comprises: the network-side network element determining the target data transmission mode; the network-side network element sending instruction information to the terminal through the base station transmission in order to instruct the terminal to switch to the target data transmission mode with which to implement data transmission; wherein, the target data transmission mode is Narrow-Band IoT (NB-IoT) data transmission or Long-Term Evolution (LTE) data transmission.

25 Claims, 7 Drawing Sheets

(56) References Cited

OTHER PUBLICATIONS

Vodaphone, et al., "Introduction of support for NB-IoT", 3GPP Draft; S2-160907, SA WG2 Meeting #113, Jan. 25-29, 2016, St. Kitts, pp. 1-52.
International Search Report dated Dec. 29, 2016, in corresponding International Application No. PCT/CN2016/106013.
Search Report dated Jul. 5, 2019, in priority application No. CN 2016100813063.

* cited by examiner

METHOD, APPARATUS, AND SYSTEM FOR DATA TRANSMISSION

FIELD OF THE INVENTION

The present disclosure is related to the field of Communications, especially a method, apparatus, and system for data transmission.

BACKGROUND

Following the swift development of wireless communication technology and the increasing demand for communications, the fifth generation of communication technology (5G) is fast approaching. An important application of 5G is Machine-Type Communications (MTC), which, with their large-scale potential for application, have garnered attention from a large number of mobile network operators, equipment manufacturers, and research institutes. MTC applications such as Smart Grid, Intelligent Transportation, Smart Home (Home Automation), remote monitoring, and wireless censoring networks make up an important part of the burgeoning Internet of Things (IoT).

Services that support MTC devices are varied. Requirements for most MTC equipment usually include low cost and low power usage, such as the equipment used for environmental monitoring or the large-scale sensors used in agriculture. Operations that support MTC devices typically do not have strict requirements with regard to time delays, but could have sensitive materials that require high speed transmission.

Fire alarm equipment, for example, includes the following services: Periodic Life-Saving Report Information does not have high time-delay requirements, and its data is as little as tens of BYTES; Fire Alarm Report Information has relatively higher time-delay requirements; its data quantities can be as small as tens of bytes or as large as a Megabyte (M) because video information might need to be reported; Server Commands have relatively higher time-delay requirements and data quantities as low as tens of bytes or even lower; Software version updates have relatively low time-delay requirements and relatively large data quantities, as much as a few Megabytes.

From this we see that the services supporting MTC equipment are varied and comprise, for example, periodic service reporting, anomaly reporting, network command issuance, and software version updates. The Quality of Service that different operations demand of the network are also different.

At the same time, some MTC equipment can transmit high-speed data. In portable applications, for example, Smart Glasses could require the transmission of video in real time, and Smart Watches could require the ability to make phone calls. These services would require greater QoS guarantees.

The quantity of MTC equipment could be enormous, and large-scale equipment access could bring large-scale signal expenditure to the network. In order to effectively lower the cost of MTC equipment and system expenditure of the network-side, the related technologies of the Third Generation Partnership Projects (3GPP) have led to the following two methods of small data transmission for optimization: the control plane optimization mode: the data packet is packaged into a non-Access Stratum (NAS) Protocol Data Unit (PDU) attached to the control plane signal for transmission; the user plane optimization mode: the terminal and the network-side use Data Radio Bearer (DRB) for data transmission; after data transmission is complete, both parties store the bearer information context and the Access Stratum (AS) security context, etc. When data is transmitted once more, both parties resume the use of DRB through the suspend-activate flow.

Each of these small data transmission methods has its pros and cons. The benefits of the control plane optimization mode include: the conservation of signaling, system expenditure, and terminal power usage. However, within the control plane optimization mode exist the following deficits: (1) Safety performance can be somewhat poor. Because no DRB response is established in the control plane optimization program, neither the network-side nor the terminal have the AS security context, and there is no way to implement AS layer encryption on the data. (2) It is not very suitable for the transmission of relatively large quantities of data, considering that the NAS PDU attached to the signal is very limited. As a result, the length of the transmitted data packet is limited. Relatively larger data packets must be divided into relatively more smaller packets. Since MTC equipment typically has poor coverage, packets are easily lost. As a result, it is difficult for the receiver to receive a complete packet. Furthermore, control plane optimization utilizes signaling for data transmission; too many small packets will bring too much signal transmission, which will occupy too many resources. (3) Low-priority data services occupy too many scheduling resources. Typically, the priority of periodic report data transmitted by MTC equipment is relatively low, but because this data is attached to the layer 3 air interface signal transmission, it receives the same scheduling priority of the typical Radio Resource Control (RRC) signal and thus encroaches on the scheduling priority of actual RRC access signals (RRC signaling transmitted without MTC data). This could result in more Air Interface failures. Besides this, when the network simultaneously supports data utilizing the control plane optimization mode for transmission and the DRB for transmission, because the priority level of the Signaling Radio Bearer (SRB) is always greater than that of the DRB, the low-priority levels can always gain higher scheduling priority levels than that of DRB so that they are processed first. This could result in being unable to guarantee the high-priority service scheduling of DRB transmission.

The user plane optimization mode has the following advantages: encryption is relatively good. Since the AS security context is retained, the system can implement AS layer encryption on the data. Encryption results have better guarantees than NAS layer encryption; support for the transmission of relatively larger rates or large packets of data is relatively good. However, the user plane optimization mode has the following deficits: (1) The result of signaling optimization is not as good as that of the control plane optimization mode. The control plane optimization mode can conserve more signaling, whereas the user plane optimization mode must first recover the bearer context information before transmitting data. Relatively speaking, the result of signal optimization does not compare to that of the control plane optimization mode. (2) Bearer context maintenance overhead is relatively large, and there is the risk of skewing.

Because the terminal and the network-side always maintain the terminal MTC service bearer context, there exists a definite system expenditure comprising internal expenditure and Central Processing Unit (CPU) expenditure. Beyond this, contextual skewing may occur with long-term use. Since MTC equipment is normally used for a long period of time, with life spans ranging from a few years to ten or more years, and since the network-side exists in a constant state of flux, there is the risk of terminal contextual differences. In addition, changes to the equipment access cells lead to additional context transfer overhead. Due to the relation of the allocations and sites of the service bearer context, when a site or cell accessed by the equipment changes, the network-side must either deliver or modify the context between the sites.

Additionally, when the NarrowBand-Internet of Things (NB-IoT) data transfer method (i.e., the control plane optimization mode or the user plane optimization mode) transmits big data, there exists the problem of time-delays being too big. Because NB-IoT cells use 200 k narrowband technology, their transmission rate is extremely low; according to the data of TR45.820, its speed is about 160 bit/s; for a 1600 byte software version update, 80 seconds are required before complete transmission is possible. Such a long transmission period will result in the blocking of terminal signal data, and risks process failure. At the same time, if the terminal needs to report video data, there is no way to fulfill video QoS with this long of a time-delay.

The 3GPP network provides NB-IoT data transmission methods (i.e., control plane optimization mode or user plane optimization mode) for MTC equipment, but merely providing a single data transmission method for MTC equipment does not fulfill the different QoS requirements of MTC service transmission scenarios when the device is met with a rush of big data. A single mode could also negatively affect the network by, for example, causing too much expenditure on the network-side.

SUMMARY OF THE INVENTION

The present disclosure provides a method, apparatus, and system for data transmission that can satisfy QoS requirements for different services.

The embodiments of the present disclosure provide a method for data transmission, comprising: the network-side network element determining the target data transmission mode, and the network-side network element sending instruction information to the terminal through the base station transmission in order to instruct the terminal to switch to the target data transmission mode with which to implement data transmission; wherein, the target data transmission mode is NarrowBand IoT (NB-IoT) data transmission or Long-Term Evolution (LTE) data transmission.

Wherein, the NB-IoT data transmission method comprises: the control plane optimization mode and the user plane optimization mode.

Wherein, the network-side network element sending instruction information to the terminal through the base station transmission in order to instruct the terminal to switch to the target data transmission mode with which to implement data transmission comprises: the network-side network element transmits the first downlink message carrying the instruction information to the base station, whereupon the base station transmits the second downlink message carrying the instruction information to the terminal in order to instruct the terminal to switch to the target data transmission mode with which to implement data transmission.

Alternatively, the first downlink message comprises one of the following: paging messages, NAS messages, and AS messages; and the second downlink message comprises one of the following: paging messages and RRC messages.

Alternatively, the network-side network element transmitting the first downlink message carrying the instruction information to the base station comprises at least one of the following: when the terminal is in an idle state, the network-side network element transmits a paging message carrying the instruction information to the base station; when the terminal is in a connected state, the network-side network element transmits the NAS message carrying the instruction information to the base station; when the terminal is in a connected state, the network-side network element transmits a paging message carrying the instruction information to the base station; and when the terminal is in a connected state, the network-side network element transmits an AS message carrying the instruction information to the base station.

Alternatively, RRC messages comprise: RRC Connection Setup messages, RRC Connection Reconfiguration messages, RRC Connection Reestablishment messages, RRC Connection Reestablishment Reject messages, RRC Connection Reject messages, RRC Connection Release messages, DL Information Transfer messages, Paging messages, the UE Information Request messages, and additional downlink air interface messages.

Alternatively, the method for downlink messages to carry instruction information comprises one of the following: adding an information element for switching the data transmission mode of the terminal, adding an information element for the target data transmission method, and adding an information element for the release reason.

Alternatively, NAS messages comprise: Detach Request messages.

Alternatively, AS messages comprise: INITIAL CONTEXT SETUP REQUEST messages, the UE CONTEXT RELEASE COMMAND messages, the UE CONTEXT RELEASE COMPLETE messages, the UE CONTEXT MODIFICATION REQUEST messages, DOWNLINK NAS TRANSPORT messages, Paging messages, E-RAB SETUP REQUEST messages, E-RAB MODIFY REQUEST messages, E-RAB RELEASE COMMAND messages, and related recovery/suspend messages added with the user plane optimization mode.

Alternatively, before the network-side network element determines the target data transmission mode, the method further comprises: the network-side network element transmits the support capacity information of the data transmission method to the terminal, and receives the support capacity information of the terminal to the data transmission method.

Alternatively, the support capacity information comprises one or more of the following: support for the user plane optimization mode information; support for the control plane optimization mode information; support for the LTE data transmission mode information; and the data transmission method recommended for use.

The embodiments of the present disclosure further provide a method for data transmission, comprising: the terminal determining the target data transmission mode according to the instruction information sent by the network-side network element, and the terminal using the target data transmission mode to transmit data; wherein, the target data transmission mode is NarrowBand IoT (NB-IoT) data transmission or Long-Term Evolution (LTE) data transmission.

Wherein, the NB-IoT data transmission method comprises: the control plane optimization mode and the user plane optimization mode.

Alternatively, before the terminal determines the target data transmission mode according to the instruction information sent by the network-side network element, the method further comprises: the terminal transmitting its support capacity information for the data transmission mode to the network-side network element, and receiving the support capacity information of the network-side network element for the data transmission mode.

Alternatively, the support capacity information comprises one or more of the following: support for the user plane optimization mode information; support for the control plane optimization mode information; support for the LTE data transmission mode information; and the data transmission method recommended for use.

The embodiments of the present disclosure further provide a method for data transmission, comprising: the Radio Access Network node receiving the first downlink message carrying the instruction information from the core-network network element; the instruction information is used to instruct the terminal to select the target data transmission mode; the RAN node transmits the second downlink message carrying the instruction information to the terminal; the terminal selects the target data transmission mode according to the instruction information; wherein, the target data transmission mode is NarrowBand IoT (NB-IoT) data transmission or Long-Term Evolution (LTE) data transmission.

Wherein, the NB-IoT data transmission method comprises: the control plane optimization mode and the user plane optimization mode.

Alternatively, the first downlink message comprises one of the following: paging messages, NAS messages, and AS messages; the second downlink message comprises one of the following: paging messages and RRC messages.

The embodiments of the present disclosure further provide an apparatus for data transmission, configured for the network-side network element, comprising: the first processing module, configured to determine the target data transmission mode; and the first transmission module, configured to use the instruction information of the base station transmission to instruct the terminal to switch to the target data transmission mode with which to implement data transmission; wherein, the target data transmission mode is NarrowBand IoT (NB-IoT) data transmission or Long-Term Evolution (LTE) data transmission.

Wherein, the first transmission module is configured to transmit the first downlink message carrying the instruction information to the base station, whereupon the base station transmits the second downlink message carrying the instruction information to the terminal in order to instruct the terminal to switch to the target data transmission mode with which to implement data transmission.

Alternatively, the first downlink message comprises one of the following: paging messages, NAS messages, and AS messages; the second downlink message comprises one of the following: paging messages and RRC messages.

Alternatively, the first transmission module is further configured to transmit the support capacity information for the data transmission mode to the terminal, and receive the support capacity information of the terminal for the data transmission mode.

The embodiments of the present disclosure further provide an apparatus for data transmission, configured for the terminal, comprising: the second processing module, configured to determine the target data transmission mode according to the instruction information of the network-side network element; and the second transmission module, configured to use the target data transmission mode to transmit data; wherein, the target data transmission mode is NarrowBand IoT (NB-IoT) data transmission or Long-Term Evolution (LTE) data transmission.

Alternatively, the second transmission module is further configured to transmit the support capacity information of the terminal for the data transmission mode to the network-side network element, and receive the support capacity information of the network-side network element for the data transmission mode.

The embodiments of the present disclosure further provide an apparatus for data transmission, configured for the RAN node, comprising: the third transmission module, configured to receive the first downlink message carrying instruction information from the core network element; the instruction information is used to instruct the terminal to select the target data transmission mode; and the fourth transmission module, configured to transmit the second downlink message carrying the instruction information to the terminal; the terminal selects the target data transmission mode according to the instruction information; wherein, the target data transmission mode is NarrowBand IoT (NB-IoT) data transmission or Long-Term Evolution (LTE) data transmission.

The embodiments of the present disclosure further provide a system for data transmission, comprising: the network-side network element, the terminal, and the RAN node.

Additionally, the embodiments of the present disclosure further provide a non-transitory computer readable storage medium storing computer-executable instructions; the computer-executable instructions are programmed to execute any of the data transmission methods of the network-side network element described herein.

Additionally, the embodiments of the present disclosure further provide a non-transitory computer-readable storage medium storing computer-executable instructions; the computer-executable instructions are programmed to execute any of the data transmission methods of the terminal described herein.

Additionally, the embodiments of the present disclosure further provide a non-transitory computer-readable storage medium storing computer-executable instructions; the computer-executable instructions are programmed to execute any of the data transmission methods of the RAN nodes described herein.

The present disclosure further provides an electronic device, comprising: at least one processor; and memory in communication with at least one processor; wherein, the memory has instructions that can be executed by at least one processor; the instructions are executed by at least one processor to implement any of data transmission methods of the network-side network element described herein.

The present disclosure further provides an electronic device, comprising: at least one processor; and memory in communication with at least one processor; wherein, the memory has instructions that can be executed by at least one processor; the instructions are executed by at least one processor to execute any of the data transmission methods of the terminal described herein.

The present disclosure further provides an electronic device, comprising: at least one processor; and memory in communication with at least one processor; wherein, the memory has instructions that can be executed by at least one processor; the instructions are executed by at least one processor to implement any of the data transmission methods of the RAN node described herein.

The embodiments of the present disclosure further provide a method, apparatus, and system for data transmission, wherein, the network-side network element determines the target data transmission mode, and the network-side network element sends instruction information to the terminal through the base station transmission in order to instruct the terminal to switch to the target data transmission mode with which to implement data transmission; wherein, the target data transmission mode is NarrowBand IoT (NB-IoT) data transmission or Long-Term Evolution (LTE) data transmission.

With the implementation of the present embodiments, the network-side network element instructs the terminal to select a data transmission method. By doing so, different data transmission methods can be used for different services (e.g., different MTC services), thereby fulfilling the QoS requirements of different services, wherein such requirements comprise time-delay requirements, security requirements, and rate requirements, etc.

After reading and understanding the detailed explanations and accompanying drawings, other aspects will become apparent.

DETAILED DESCRIPTION

The embodiments of the present disclosure are described in detail below with reference to the accompanying drawings. It should be understood that the embodiments outlined below are only meant to explain and describe the present disclosure, and do not serve to limit it. The embodiments and their characteristics may be combined at will in a non-conflicting manner.

Figure 1:
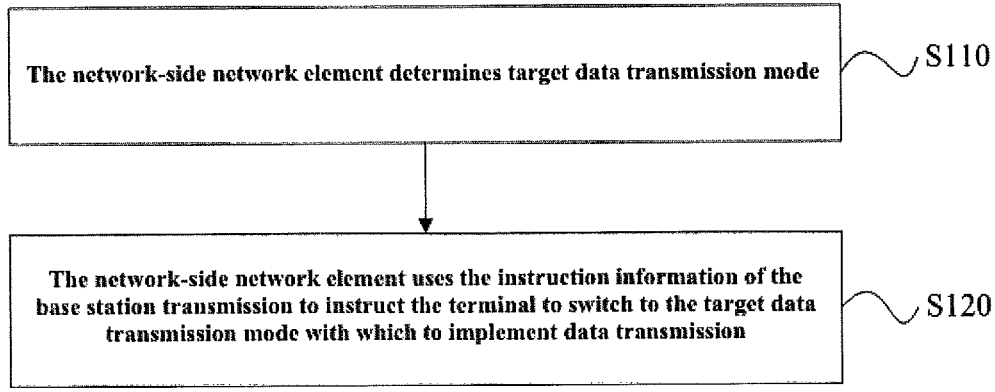
FIG. 1 is a flowchart of the data transmission methods provided by the present embodiments.

FIG. 1 is a flowchart of the data transmission method provided by the present embodiments. As is shown in FIG. 1, the data transmission method of the present embodiments is applicable to the network-side network element, and comprises: in S110, the network-side network element determines the target data transmission mode; in S120, the network-side network element sends instruction information to the terminal through the base station transmission in order to instruct the terminal to switch to the target data transmission mode with which to implement data transmission.

Wherein, the target data transmission mode is the NB-IoT data transmission mode or the LTE data transmission mode. The NB-IoT data transmission mode comprises: the control plane optimization mode and the user plane optimization mode. The network-side network element can instruct the terminal to switch to the control plane optimization mode, the user plane optimization mode, or the LTE data transmission mode. In other words, the network-side network element triggers the terminal to switch between the NB-IoT data transmission mode and the LTE data transmission mode, which comprises: switching between the control plane optimization mode and the LTE data transmission mode, switching between the user plane optimization mode and the LTE data transmission mode, as well as switching between the user plane optimization mode and the control plane optimization mode.

Alternatively, before S110, the method further comprises: the network-side network element transmits the support capacity information for the data transmission method to the terminal, and receives the support capacity information of the terminal for the data transmission method.

Within the present embodiment, during the attachment process the terminal and the network-side network element each communicate their data transmission mode support capability information, and the terminal and the network-side network element save the mutual support capability information. The support capability information comprises one or more of the following: support for the control plane optimization mode information, that is, whether or not the control plane optimization mode is supported; support for the user plane optimization mode information, that is, whether or not the user plane optimization mode is supported; support for the LTE data transmission mode information, that is, whether or not the LTE data transmission mode is supported; recommended data transmission mode, such as recommending the use of the user plane optimization mode, the control plane optimization mode, or the LTE data transmission mode.

Alternatively, S110 comprises: the network-side network element determines the desired target data transmission mode according to the current service's characteristics (e.g., the current service's QoS characteristics) and/or the size of the data.

Wherein, S120 comprises: the network-side network element transmits the first downlink message carrying the instruction information to the base station, whereupon the base station transmits the second downlink message carrying the instruction information to the terminal in order to instruct the terminal to switch to the target data transmission mode with which to implement data transmission.

Alternatively, the first downlink message comprises one of the following: paging messages, Non-Access Stratum (NAS) messages, and Access Stratum (AS) messages; the second downlink message comprises one of the following: paging messages and Radio Resource Control messages.

Alternatively, the network-side network element transmitting the first downlink message carrying the instruction information to the base station comprises at least one of the following: when the terminal is in an idle state, the network-side network element transmits a paging message carrying the instruction information to the base station; when the terminal is in a connected state, the network-side network element transmits the NAS message carrying the instruction information to the base station; when the terminal is in a connected state, the network-side network element transmits a paging message carrying the instruction information to the base station; and when the terminal is in a connected state, the network-side network element transmits an AS message carrying the instruction information to the base station.

Alternatively, the method for downlink messages to carry instruction information comprises one of the following: adding an information element for switching the data transmission mode of the terminal; adding an information element for the target data transmission mode; adding an information element for the release reason.

In an alternative embodiment, the network-side network element transmits paging messages to instruct the terminal to select the target data transmission mode. The core-network network element (e.g., Mobility Management Entity (MME)) transmits paging messages to the RAN node (e.g., the base station) through the S1 interface, instructing the terminal to select the data transmission mode, wherein, the method for using paging messages for instructing the terminal to select the data transmission method can comprises: the paging message adding an information element for the terminal to switch data transmission modes, or adding an information element for the desired target data transmission mode to be switched to. The RAN node transmits the paging messages to the terminal through the air interface, and instructs the terminal to switch data transmission modes; or, the RAN node notifies the terminal to implement data transmission mode switching using downlink RRC messaging, wherein, the method for instructing the terminal to switch data transmission modes using downlink messaging can comprise: downlink messages adding an information element for the terminal to switch data transmission modes, or adding an information element for the desired target data transmission mode to be switched to.

In an alternative embodiment, the network-side network element transmits NAS messages to instruct the terminal to select the target data transmission mode. The core-network network element (e.g., MME) transmits downlink information to the base station through the S1 interface, and instructs the terminal to switch data transmission modes, wherein, the method for instructing the terminal to switch data transmission modes using downlink information can comprise: downlink messages adding an information element for the terminal to switch data transmission modes, or adding an information element for the desired target data transmission mode to be switched to, wherein, downlink NAS messages can comprise the following messages: Detach Request messages, etc.

In an alternative embodiment, the network-side network element transmits AS messages to instruct the terminal to switch to the target data transmission mode. The core-network network element (e.g., MME) transmits downlink AS messages to the base station through the S1 interface, and instructs the terminal to switch data transmission modes.

Alternatively, downlink AS messages can comprise the S1 bearer information requiring reconfiguration, establishment, or deletion by the target data transmission mode, as well as security context information, etc. Wherein, the method for instructing the terminal to switch data transmission modes using downlink information can comprise: adding an information element for the target data transmission mode to be switched to, or adding an information element for the release reason, wherein, downlink AS messages can comprise the following types of message: INITIAL CONTEXT SETUP REQUEST messages, the UE CONTEXT RELEASE COMMAND messages, the UE CONTEXT RELEASE COMPLETE messages, the UE CONTEXT MODIFICATION REQUEST messages, DOWNLINK NAS TRANSPORT messages, Paging messages, Evolution Radio Access Bearer (E-RAB) SETUP REQUEST messages, E-RAB MODIFY REQUEST messages, E-RAB RELEASE COMMAND messages, and resume/suspend related messages added with the user plane optimization mode, as well as any other additional information.

Alternatively, the base station transmits messages to the terminal through the air interface, and instructs the terminal to switch data transmission modes. After the base station receives the instruction information from the network-side network element, it stores the contextual information required for the target data transmission mode, and in response implements reconfiguration, deletion, or establishment processing of the S1 bearer; the response initiates the reconfiguration, deletion, or establishment of the air interface bearer.

Alternatively, the base station alerts the terminal to switch data transmission modes through downlink RRC messages; or, when there is reconfiguration, deletion, or establishment of an air interface bearer, configuration information of the air interface bearer can also be included.

Wherein, the method used for instructing the terminal to switch data transmission modes can comprise: adding an information element for the target data transmission mode and adding an information element for the release reason.

Wherein, downlink RRC messages can comprise the following types of information: RRC Connection Setup messages, RRC Connection Reconfiguration messages, RRC Connection Reestablishment messages, RRC Connection Reestablishment Reject messages, RRC Connection Reject messages, RRC Connection Release messages, DL Information Transfer messages, Paging messages, the UE Information Request messages, and additional downlink air interface messages.

Within the present embodiment, terminals comprise: MTC terminals, any terminals that support the NB-IOT data transmission mode and the LTE data transmission mode. Alternatively, the LTE data transmission mode can be any mode supporting large data transmission. Wherein, traditional LTE data transmission modes can better support large data transfer, without the need to change protocols; they can support MTC applications with relatively large data quantities, such as video reporting or software version updates.

Owing to the network-side network element instructing the terminal to switch data transmission modes, the data transmission methods of the present embodiments can increase the QoS protections of services such as MTC services. For different services (e.g., MTC services), different data transmission methods can be utilized, and thus the varying QoS requirements for different MTC services (comprising time delay requirements, security requirements, and rate requirements, etc.) can be satisfied.

Additionally, for non-MTC terminals, when both large and small data are transmitted for two types of services, the NB-IoT transmission mode can be used to implement small data transmission so that the terminal can save power and the network can conserve signal expenditure.

Figure 2:
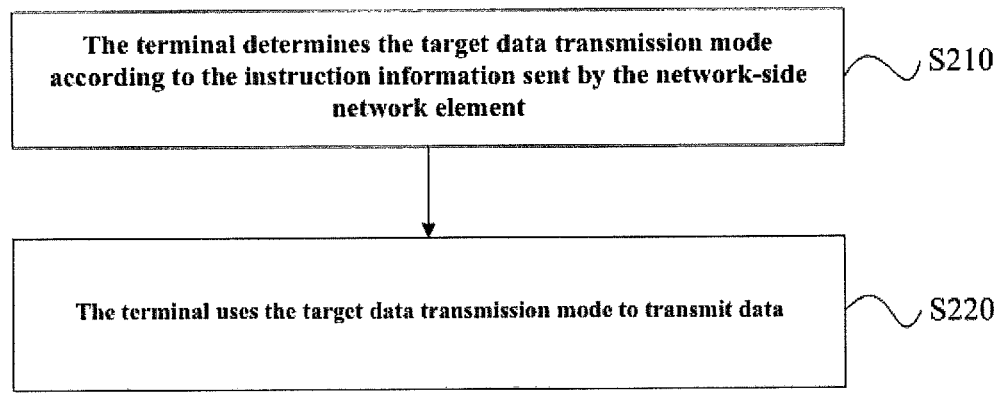
FIG. 2 is another flowchart of the data transmission methods provided by the present embodiments.

FIG. 2 is another flowchart of the data transmission method provided by the present embodiments. As FIG. 2 shows, the data transmission method of the present embodiments is applicable to the terminal, and comprises: in S210, the terminal determines the target data transmission mode according to the instruction information sent by the network-side network element; in S220, the terminal utilizes the target data transmission mode to transmit data; wherein, the target data transmission mode is the NB-IoT data transmission mode or the LTE data transmission mode.

The NB-IoT data transmission mode comprises: the control plane optimization mode and the user plane optimization mode. In other words, the terminal can, under the instruction of the network-side network element, switch to the control plane optimization mode, the user plane optimization mode, or the LTE data transmission mode.

Alternatively, before S210, the method further comprises: the terminal transmitting its support capacity information for the data transmission mode to the network-side network element, and receiving the support capacity information of the network-side network element for the data transmission mode.

Within the present embodiment, during the attachment process the terminal and the network-side network element each communicate their data transmission mode support capability information, and the terminal and the network-side network element save the mutual support capability information. The support capability information comprises one or more of the following: support for the control plane optimization mode information; support for the user plane optimization mode information; support for the LTE data transmission mode information; and recommendations for any of the following data transmission modes: the user plane optimization mode, the control plane optimization mode, and the LTE data transmission mode.

Within the present embodiment, terminals comprise: MTC terminals, any terminals that support NB-IOT data transmission and LTE data transmission. Alternatively, the LTE data transmission mode can be any mode supporting large data transmission. Wherein, traditional LTE data transmission modes can better support large data transfer without the need to change protocols; they can support MTC applications with relatively large data quantities, such as video reporting or software version updates.

The data transmission methods of the present embodiments can increase the QoS protections of services (e.g., MTC services). For different services (e.g., MTC services), different data transmission methods can be utilized, and thus the varying QoS requirements for different MTC services (comprising time delay requirements, security requirements, and rate requirements, etc.) can be satisfied. Additionally, for non-MTC terminals, when both large and small data are transmitted for two types of services, the NB-IoT transmission method can be used to implement small data transmission so that the terminal can save power and the network can conserve signal expenditure.

Figure 3:
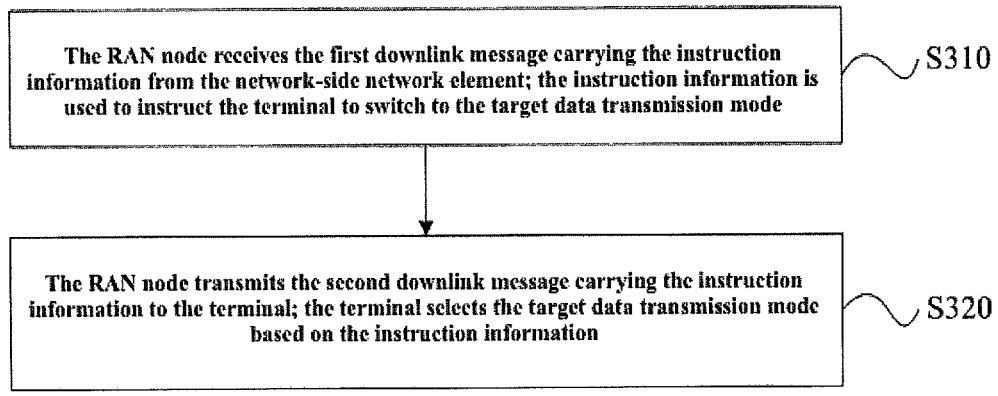
FIG. 3 is another flowchart of the data transmission methods provided by the present embodiments.

FIG. 3 is another flowchart of the data transmission methods provided by the present embodiments. As FIG. 3 shows, the data transmission methods of the present embodiment is applicable to the Radio Access Network (RAN) node, and comprises: in S310, the RAN node receives the first downlink message carrying the instruction information from the core-network network element; the instruction information is used to instruct the terminal to select the target data transmission mode; in S320, the RAN node transmits the second downlink message carrying the instruction information to the terminal; the terminal selects the target data transmission mode according to the instruction information, wherein, the target data transmission mode is NarrowBand IoT (NB-IoT) data transmission or Long-Term Evolution (LTE) data transmission. The NB-IoT data transmission mode comprises: the control plane optimization mode and the user plane optimization mode.

Alternatively, the first downlink message comprises one of the following: paging messages, NAS messages, AS messages, as well as attached response messages; the second downlink message comprises one of the following: paging messages and RRC messages.

Within the present embodiment, the RAN node is, for example, the base station (eNodeB). The base station, through the S1 interface, receives paging messages that instruct the terminal to switch data transmission modes from the core-network network element (e.g., MME), and transmits the paging messages carrying the instruction information or RRC messages to the terminal in order to instruct the terminal to switch data transmission modes. Wherein, the method for instructing the terminal to switch data transmission modes using downlink information can comprise: adding an information element for the terminal to switch data transmission modes, or adding an information element for the desired target data transmission mode to be switched to.

Alternatively, when the terminal is in an active state, the base station, through the S1 interface, receives the NAS messages carrying instruction information from the core-network network element (e.g., MME), and transmits the downlink information carrying the instruction information to the terminal in order to instruct the terminal to switch data transmission modes; wherein, the method for instructing the terminal to switch data transmission modes using downlink information can comprise: adding an information element for the terminal to switch data transmission modes, or adding an information element for the desired target data transmission mode to be switched to.

Alternatively, when the terminal is in an active state, the base station, through the S1 interface, receives the AS messages carrying the instruction information from the core-network network element (e.g., MME), and transmits the paging messages carrying the instruction information or RRC messages to the terminal in order to instruct the terminal to switch data transmission modes. Wherein, the method for instructing the terminal to switch data transmission modes using downlink information can comprise: adding an information element for the target data transmission method to be switched to, or adding an information element for the release reasons.

The present disclosure is described in detail below using possible embodiments, wherein Embodiment 1 through Embodiment 7 are embodiments that implement mutual switching between the control plane optimization mode and the LTE data transmission mode, Embodiment 8 through Embodiment 14 are embodiments that implement mutual switching between the user plane optimization mode and the LTE transmission mode, and Embodiment 15 through Embodiment 20 are embodiments that implement mutual switching between the control plane optimization mode and the user plane optimization mode.

Embodiment 1

Within the present embodiment, User Equipment (UE) and the network-side both support the LTE data transmission mode and the control plane optimization mode. The UE and the network-side currently negotiate to use the control plane optimization mode through the ATTACH process, and the UE is currently in an IDLE state; the network-side uses the downlink paging messages carrying instruction information to instruct the UE to switch from the control plane optimization mode to the LTE data transmission mode.

Figure 4:
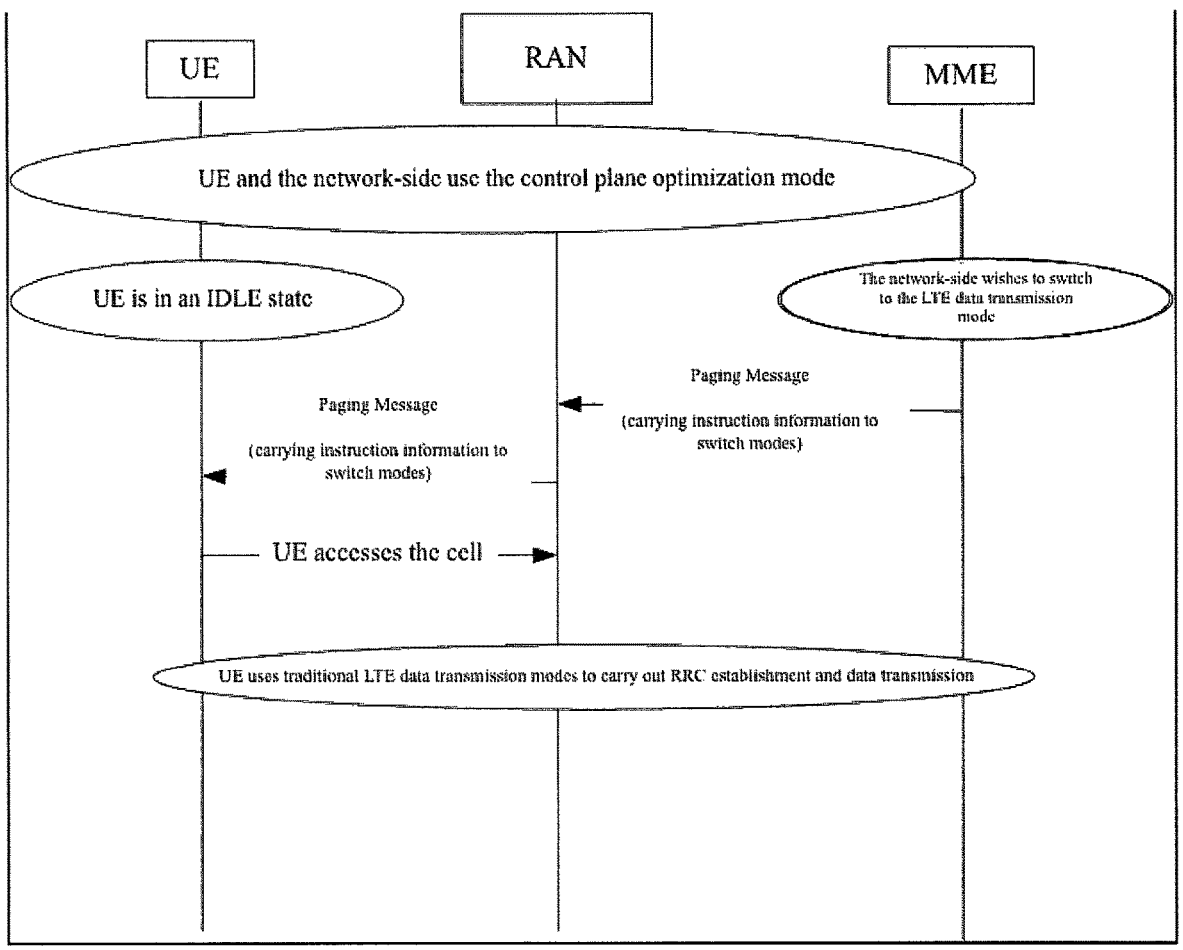
FIG. 4 is a signaling interaction flowchart of the data transmission method provided by Embodiment 1 of the present disclosure.

As FIG. 4 shows, the method provided by the present embodiment comprises: in S101, the network-side has a large amount of data for transmission, such as a software version update, and wishes to switch to the LTE data transmission mode for transmission; MME transmits paging messages on the S1 interface to the RAN node (e.g., the base station), which contain instructions to switch to the LTE data transmission mode; the base station transmits paging messages on the Uu interface to the UE, which contain instructions to switch to the LTE data transmission mode; in S102, after receiving the transmission, the UE uses the LTE data transmission mode to initiate an RRC connection and a bearer setup procedure to transmit data.

Embodiment 2

Within the present embodiment, the UE and the network-side both support the LTE data transmission mode and the control plane optimization mode. The UE and the network-side currently consult to use the control plane optimization mode through the ATTACH process; the UE is currently in a connected state; the network-side switches the control plane optimization mode to the LTE transmission mode by releasing the current RRC connection and then re-accessing.

The method of the present embodiment comprises: in S201, the network-side has a large amount of data for transmission, such as a software version update, and wishes to switch to the LTE data transmission mode for transmission; MME transmits a UE CONTEXT RELEASE COMMAND message, which contains instructions to switch to the LTE data transmission mode, to the base station; the base station transmits an RRCConnectionRelease message on the Uu interface to the UE, which contains instructions to switch to the LTE data transmission mode; in S202, after receiving the transmission, the UE releases the current RRC connection and once more uses the LTE data transmission mode to initiate an RRC connection and a bearer setup procedure to transmit data; subsequently, the UE and the network-side use the LTE data transmission mode to establish an RRC connection and a DRB bearer to implement data transmission.

Embodiment 3

Within the present embodiment, the UE and the network-side both support the LTE data transmission mode and the control plane optimization mode. The UE and the network currently consult to utilize the control plane optimization mode through the ATTACH process; the UE is currently in a connected state; the network-side switches the control plane optimization mode to the LTE data transmission mode using RRC reconfiguration.

The method of the present embodiment comprises: in S301, the network-side has a large amount of data for transmission, such as a software version update, and wishes to switch to the LTE data transmission mode for transmission; MME transmits an INITIAL CONTEXT SETUP REQUEST message to the base station, which contains instructions to switch to the LTE data transmission mode, Radio Access Bearer (RAB) information requiring establishment, and AS context, etc.; in S302, the base station creates the RAB bearer information and the air interface Radio Bearer (RB) information required by the LTE data transmission mode, and transmits to the UE using RRC reconfiguration messages on the Uu interface, wherein the messaging contains instructions to switch to the LTE data transmission mode, air interface Radio Bearer (RB) messages requiring configuration, and AS context, etc; in S302, after receiving the transmission, the UE establishes the bearer information of the LTE data transmission mode, which comprises AS security context, etc., whereupon the UE and the network-side utilize the LTE data transmission mode to establish an RRC connection and a DRB bearer to initiate data transmission.

Embodiment 4

Within the present embodiment, the UE and the network-side both support the LTE data transmission mode and the control plane optimization mode. The UE and the network-side currently consult to utilize the LTE data transmission mode through the ATTACH process; the UE is currently in an IDLE state; using the instruction information added to the downlink paging messages, the network-side instructs the terminal to switch from the LTE data transmission mode to the control plane optimization mode.

The method of the present embodiment comprises: in S401, the network-side has a small amount of data for transmission, and wishes to switch to the control plane optimization mode for transmission; MME transmits paging messages on the S1 interface to the base station, wherein the message contains instructions to switch to the control plane optimization mode; the base station transmits paging messages on the Uu interface to the UE, wherein the messages contain instructions to switch to the control plane optimization mode; in S402, after receiving the transmission, the UE uses the control plane optimization mode to initiate an RRC connection setup procedure in order to transmit data.

Embodiment 5

Within the present embodiment, the UE and the network-side both support the LTE data transmission mode and the control plane optimization mode. Presently, the UE and the network-side are using the LTE data transmission mode; the UE is currently in a connected state; the network switches from the LTE data transmission mode to the control plane optimization mode by releasing the current RRC connection and re-accessing.

Figure 5:
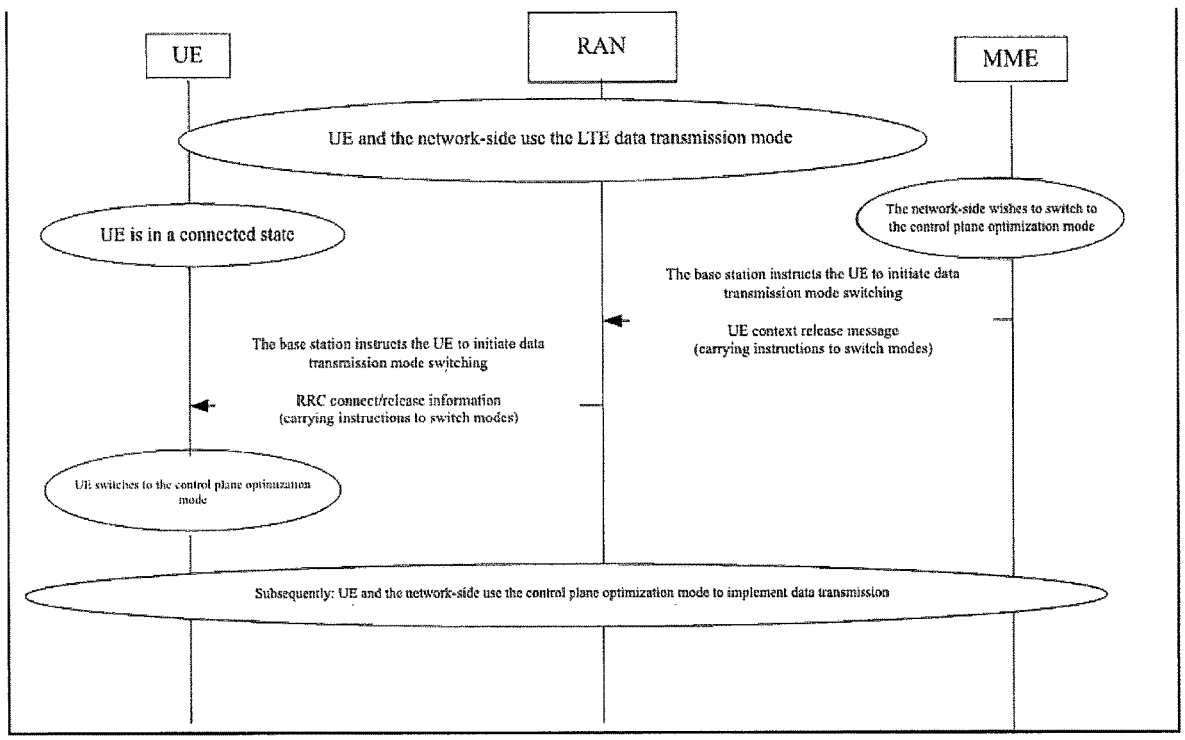
FIG. 5 is a signaling interaction flowchart of the data transmission method provided by Embodiment 5 of the present disclosure.

As FIG. 5 shows, the method of the present embodiment comprises: in S501, the network-side has a small amount of data for transmission, and wishes to switch to the control plane optimization mode for transmission; MME transmits the UE CONTEXT RELEASE COMMAND message to the base station; this message contains instructions to switch to the control plane optimization mode; the base station transmits the RRCConnectionRelease message on the Uu interface to the UE; this message contains instructions to switch to the control plane optimization mode; in S502, after receiving the transmission, the UE releases the current RRC connection and once more uses the control plane optimization mode to initiate an RRC connection with which transmit data.

Embodiment 6

Within the present embodiment, the UE and the network-side both support the LTE data transmission mode and the control plane optimization mode. Presently, the UE and the network-side are using the LTE data transmission mode; the UE is currently in a connected state; the network-side switches from the LTE data transmission mode to the control plane optimization mode using RRC reconfiguration.

Figure 6:
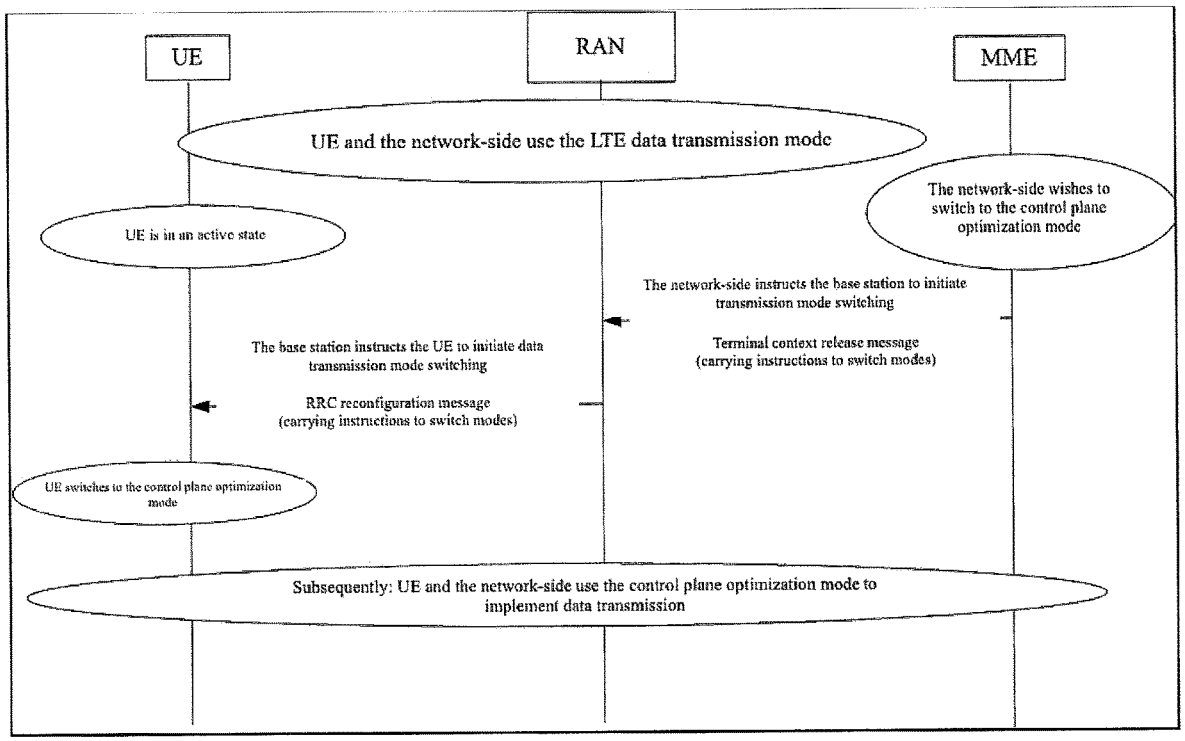
FIG. 6 is a signaling interaction flowchart of the data transmission method provided by Embodiment 6 of the present disclosure.

As FIG. 6 shows, the method of the present embodiment comprises: in S601, the network-side has a small amount of data for transmission, and wishes to switch to the control plane optimization mode for transmission; MME transmits the UE CONTEXT RELEASE COMMAND message to the base station, wherein the message contains instructions to switch to the control plane optimization mode, awaiting deletion information, or Evolved-Radio Access Bearer information; in S602, the base station deletes or reallocates the corresponding E-RAB, initiates deletion or reconfiguration of the air interface RB, and transmits to the UE through RRC reconfiguration messages on the Uu interface, wherein the message contains instructions to switch to the control plane optimization mode, and RB information awaiting deletion or reconfiguration; in S603, after receiving the transmission, the UE deletes or reallocates the corresponding RB, whereupon the UE and the network-side use the control plane optimization mode to implement data transmission.

Embodiment 7

Within the present embodiment, the UE and the network-side both support the LTE data transmission mode and the control plane optimization mode. Presently, the UE and the network-side are using the LTE data transmission mode; the UE is currently in a connected state; the network-side uses the downlink message to instruct the terminal to switch from the LTE data transmission mode to the control plane optimization mode, without releasing the bearer mode.

The method of the present embodiment comprises the following steps: in S701, the network-side has a small amount of data for transmission, and wishes to switch to the control plane optimization mode for transmission; MME transmits the INITIAL CONTEXT SETUP REQUEST message on the S1 interface to the base station, wherein the message contains instructions to switch to the control plane optimization mode; in S702, the base station transmits the RRCConnectionReconfiguration message on the downlink Uu interface to the terminal, wherein the message contains instructions to switch to the control plane optimization mode; in S703, after receiving the transmission, the UE uses the control plane optimization mode to initiate data transmission with the network-side.

Embodiment 8

Within the present embodiment, the UE and the network-side both support LTE data transmission mode and the user plane optimization mode. Presently the UE and the network-side consult to use the user plane optimization mode through the ATTACH process; the UE is currently in an IDLE state; the network-side uses the instruction information added to the downlink message to instruct the UE to switch from the user plane optimization mode to the LTE data transmission mode.

The method of the present embodiment comprises: in S801, the network-side has a large amount of data for transmission, such as a software version update, and wishes to switch to the LTE data transmission mode for transmission; MME transmits the paging message on the S1 interface to the base station, wherein the message contains instructions to switch to the LTE data transmission mode; the base station transmits the paging message on the Uu interface to the UE, wherein the message contains instructions to switch to the LTE data transmission mode; in S802, after receiving the transmission, the UE uses the LTE data transmission mode to initiate an RRC connection and a bearer setup procedure for data transmission.

Embodiment 9

Within the present embodiment, the UE and the network-side both support LTE data transmission mode and the user plane optimization mode. Presently the UE and the network-side consult to use the user plane optimization mode through the ATTACH process; the UE is currently in an IDLE state; the network-side uses the instruction information carried by the downlink message to instruct the UE to switch from the user plane optimization mode to the LTE data transmission mode.

The method of the present embodiment comprises: in S901, the network-side has a large amount of data for transmission, such as a software version update, and wishes to switch to the LTE data transmission mode for transmission; MME transmits the paging message on the S1 interface to the base station, wherein the message contains instructions to switch to the LTE data transmission mode; the base station transmits paging messages on the Uu interface to the UE, wherein the message contains instructions to switch to the LTE data transmission mode; in 902, the UE uses the user plane optimization mode to implement bearer recovery, but instruction information to use the LTE data transmission mode for data transmission is newly added; after receiving the transmission, the UE adds instruction information to the uplink RRC message, informing the base station to use the LTE data transmission mode for data transmission; after receiving the transmission, the base station adds instruction information to the uplink S1 message, informing the MME to use the LTE data transmission mode for data transmission.

Alternatively, in S903, if the network-side requires reconfiguration or newly created bearers, the UE is notified through the reconfiguration message; if the MME requires newly created or reconfigured S1 bearers, the base station is notified through the INITIAL CONTEXT SETUP REQUEST message, which carries the E-RAB information requiring configuration; accordingly, the base station implements E-RAB configuration processing of the S1 bearer.

If the base station requires newly added or reconfigured RB bearers on the air interface, the UE is notified through the RRC reconfiguration message on the air interface, and accordingly implements the corresponding RB bearer configuration processing.

In S904, the UE and network-side use the LTE data transmission mode to implement data transmission.

Embodiment 10

Within the present embodiment, the UE and the network-side both support LTE data transmission mode and the user plane optimization mode. Presently, the UE and the network-side consult to use the user plane optimization mode through the ATTACH process; the UE is currently in a connected state; the network-side uses the instruction information carried by the downlink message to instruct the UE to switch from the user plane optimization mode to the LTE data transmission mode by releasing the current RRC connection.

The method of the present embodiment comprises: in S1001, the network-side has a large amount of data for transmission, such as a software version update, and wishes to switch to the LTE data transmission mode for transmission; MME transmits the UE CONTEXT RELEASE COMMAND message on the S1 interface to the base station, wherein the message contains instructions to switch to the LTE data transmission mode; the base station transmits the RRCConnectionRelease message on the Uu interface to the UE, wherein the message contains instructions to switch to the LTE data transmission mode; in S1002, after receiving the transmission, the UE releases the current RRC connection and subsequently uses the LTE data transmission mode to initiate an RRC connection and a bearer setup procedure for data transmission.

Embodiment 11

Within the present embodiment, the UE and the network-side both support LTE data transmission mode and the user plane optimization mode. Presently, the UE and the network-side consult to use the user plane optimization mode through the ATTACH process; the UE is currently in a connected state; the network-side switches from the user plane optimization mode to the LTE data transmission mode through reconfiguration.

The method of the present embodiment comprises: in S111, the network-side has a large amount of data for transmission, such as a software version update, and wishes to switch to the LTE data transmission mode for transmission; MME transmits the INITIAL CONTEXT SETUP REQUEST message on the S1 interface to the base station, wherein the message contains instructions to switch to the user plane optimization mode; the base station transmits the RRCConnectionReconfiguration message on the Uu interface to the UE, wherein the message contains instructions to switch to the user plane optimization mode.

Alternatively, if the network-side needs to reconfigure, create, or delete existing bearers, the UE is notified through the reconfiguration message.

If the MME decides it needs to create, reconfigure, or delete S1 bearers, the base station is notified through the INITIAL CONTEXT SETUP REQUEST message on the S1 interface, wherein the message contains the corresponding E-RAB instruction information, and the base station accordingly implements configuration processing of the S1 bearer.

If the base station needs to implement bearer creation, reconfiguration, or deletion on the air interface, it implements the corresponding RB bearer processing, and notifies the UE through the RRC reconfiguration message on the air interface; accordingly, the UE implements the corresponding RB bearer configuration processing.

In S112, the UE and the network-side use user plane optimization mode to implement data transmission.

Embodiment 12

Within the present embodiment, the UE and the network-side both support the LTE data transmission mode and the user plane optimization mode. Presently, the UE and the network-side are using the LTE data transmission mode for data transmission; the UE is currently in an IDLE state; the network-side uses the instruction information carried by the downlink message to instruct the terminal to switch from the LTE data transmission mode to the user plane optimization mode.

The method of the present embodiment comprises: in S121, the network-side has a small amount of data for transmission, and wishes to switch to the user plane optimization mode for data transmission; MME transmits paging messages on the S1 interface to the base station, wherein the message contains instructions to switch to the user plane optimization mode; the base station transmits paging messages on the Uu interface to the UE, wherein the message contains instructions to switch to the user plane optimization mode; in S122, after receiving the transmission, the UE reinitiates the ATTACH process before using the user plane optimization mode to initiate the RRC bearer setup procedure for data transmission.

Embodiment 13

Within the present embodiment, the UE and the network-side both support LTE data transmission mode and the user plane optimization mode. Presently, the UE and the network-side are using the LTE data transmission mode; the UE is currently in a connected state; the network-side uses the instruction information carried by the downlink information to instruct the UE to release the current RRC connection and then re-access in order to switch from the LTE data transmission mode to the user plane optimization mode.

The method of the present embodiment comprises: in S131, the network-side has a small amount of data for transmission, and wishes to switch to the user plane optimization mode for transmission; MME transmits the UE CONTEXT RELEASE COMMAND message on the S1 interface to the base station, wherein the message contains instructions to switch to the user plane optimization mode; the base station transmits the RRCConnectionRelease on the Uu interface to the UE, wherein the message contains instructions to switch to the user plane optimization mode; in S132, after receiving the transmission, the UE releases the current RRC connection and reinitiates the ATTACH access process, whereupon it uses the user plane optimization mode to initiate the RRC bearer setup procedure for data transmission.

Embodiment 14

Within the present embodiment, The UE and the network-side both support LTE data transmission mode and the user plane optimization mode. Presently, the UE and the network-side are using the LTE data transmission mode; the UE is currently in a connected state; the network-side uses RRC reconfiguration to instruct the UE to switch from the LTE data transmission mode to the user plane optimization mode.

The method of the present embodiment comprises: in S141, the network-side has a small amount of data for transmission, and wishes to switch to the user plane optimization mode for transmission; MME transmits the INITIAL CONTEXT SETUP REQUEST message on the S1 interface to the base station, wherein the message contains instructions to switch to the user plane optimization mode; the base station transmits the RRCConnectionReconfiguration message on the downlink Uu interface to the UE, wherein the message contains instructions to switch to the user plane optimization mode; alternatively, if the network-side needs to create, reconfigure, or delete bearers, the UE is notified through the reconfiguration message; if the MME decides it needs to create, reconfigure, or delete S1 bearers, the base station is notified through the INITIAL CONTEXT SETUP REQUEST message on the S1 interface, wherein the message contains the E-RAB information requiring creation, reconfiguration, or deletion, and the base station accordingly implements configuration processing of the S1 bearer; if the base station needs to implement creation, deletion, or reconfiguration of the bearers on the air interface, it implements the corresponding RB configuration processing, and alerts the UE through the RRC reconfiguration message on the air interface; accordingly, the UE implements the corresponding RB bearer configuration processing; in S142, the UE and the network-side use the user plane optimization mode to implement data transmission.

Embodiment 15

Within the present embodiment, the UE and the network-side both support the control plane optimization mode and the user plane optimization mode; the UE and the network currently consult to utilize the control plane optimization mode through the ATTACH process; the UE is currently in an IDLE state; the network-side switches from the control plane optimization mode to the user plane optimization mode through RRC reconfiguration.

The method of the present embodiment comprises: in S151, the network-side has a large amount of data for transmission, such as a software version update, and wishes to switch to the user plane optimization mode for transmission; MME transmits paging messages on the S1 interface to the base station, wherein the message contains instructions to switch to the user plane optimization mode; the base station transmits paging messages on the Uu interface to the UE, wherein the message contains instructions to switch to the user plane optimization mode; in S152, after receiving the transmission, the UE carries information for switching to the user plane optimization in the RRCConnectionRequest message; in S153 after receiving the message, the base station notifies the MME through the INITIAL UE MESSAGE on the S1 interface of the uplink, wherein the message contains instructions to switch to the user plane optimization mode; in S154, after receiving the message, MME establishes the bearer information required by the user plane optimization mode; MME transmits the INITIAL CONTEXT SETUP message to the base station, wherein the message contains instructions to switch to the user plane optimization mode, E-RAB information requiring establishment, and AS context, etc.; in S155, the base station creates new E-RAB bearer information needed by the user plane optimization mode, as well as air interface RB bearer information, and transmits to the terminal through RRC reconfiguration messages on the Uu interface, wherein the message contains instructions to switch to the user plane optimization mode, air interface RB bearer information requiring configuration, and AS context, etc.; in S156, after receiving the transmission, the UE will establish the bearer information of the user plane optimization mode, which comprises AS security context, etc., whereupon the UE and the network-side utilize the user plane optimization mode to implement data transmission.

Embodiment 16

Within the present embodiment, the UE and the network-side both support the control plane optimization mode and the user plane optimization mode; the UE and the network-side currently consult to utilize the control plane optimization mode through the ATTACH process; the UE is currently in a connected state; the network-side uses reconfiguration to switch from the control plane optimization mode to the user plane optimization mode.

The method of the present embodiment comprises: in S161, the network-side has a large amount of data for transmission, such as a software version update, and wishes to switch to the user plane optimization mode for transmission; MME transmits the INITIAL CONTEXT SETUP message to the base station, wherein the message contains instructions to switch to the user plane optimization mode, E-RAB information requiring establishment, and AS context, etc.; in S162, the base station creates new E-RAB bearer information needed by the user plane optimization mode, as well as air interface RB bearer information, and transmits to the terminal through RRC reconfiguration messages on the Uu interface, wherein the message contains instructions to switch to the user plane optimization mode, air interface RB bearer information requiring configuration, and AS context, etc.; in S163, after receiving the transmission, the UE will establish the bearer information of the user plane optimization mode, which comprises AS security context, etc., before using the user plane optimization mode to implement data transmission.

Embodiment 17

Within the present embodiment, the UE and the network-side both support the control plane optimization mode and the user plane optimization mode. Presently the UE and the network-side consult to use the user plane optimization mode through the ATTACH process; the UE is currently in an IDLE state; the network-side uses reconfiguration to switch from the user plane optimization mode to the control plane optimization mode.

The method of the present embodiment comprises: in S171, the network-side has a small amount of data for transmission, and wishes to switch to the control plane optimization mode for transmission; MME transmits paging messages on the S1 interface to the base station, wherein the message contains instructions to switch to the control plane optimization mode; the base station transmits the paging message on the Uu interface to the UE, wherein the message contains instructions to switch to the control plane optimization mode; in S172, after receiving the transmission, the UE carries information for switching to the control plane optimization in the RRCConnectionRequest message; in S173, after receiving the message, the base station notifies the MME through the INITIAL UE MESSAGE on the S1 interface of the uplink, wherein the message contains instructions to switch to the control plane optimization mode; in S174, after receiving the message, the MME deletes the bearer information of the user plane optimization mode; MME transmits the INITIAL CONTEXT SETUP message to the base station, wherein the message contains instructions to switch to the control plane optimization mode, as well as E-RAB information requiring deletion or reconfiguration, etc.; in S175, the base station deletes the E-RAB bearer information required by the user plane optimization mode, as well as the air interface RB bearer information requiring reconfiguration or deletion, and transmits to the UE through the RRC reconfiguration message on the Uu interface, wherein the message contains instructions to switch to the control plane optimization mode, as well as air interface bearer information requiring deletion or reconfiguration, etc.; in S176, after receiving the transmission, the UE will delete the bearer information, etc., of the user plane optimization mode; subsequently, the UE and the network-side use the control plane optimization mode to implement data transmission.

Embodiment 18

Within the present embodiment, the UE and the network-side both support the control plane optimization mode and the user plane optimization mode. Presently, the UE and the network-side are using the user plane optimization mode; the UE is currently in a connected state; the network-side uses reconfiguration to switch from the user plane optimization mode to the control plane optimization mode.

The method of the present embodiment comprises: in S181, the network-side has a small amount of data for transmission, and wishes to switch to the control plane optimization mode for transmission; MME transmits the INITIAL CONTEXT SETUP message to the base station, wherein the message contains instructions to switch to the control plane optimization mode and E-RAB information requiring deletion or reconfiguration, etc.; in S182, the base station deletes the E-RAB bearer information required by the user plane optimization mode, as well as air interface RB bearer information requiring reconfiguration or deletion, and transmits to the UE through the RRC reconfiguration message on the Uu interface, wherein the message contains instructions to switch to the control plane optimization mode and the air interface RB bearer information requiring deletion or reconfiguration, etc.; in S183, after receiving the transmission, the UE will delete the user plane optimization mode bearer information, etc.; subsequently, the terminal and the network-side use the control plane optimization mode to implement data transmission.

Embodiment 19

Within the present embodiment, the UE and the network-side both support the control plane optimization mode and the user plane optimization mode. Presently, the UE and the network-side are using the user plane optimization mode; the UE is currently in a connected state; the network-side uses the downlink message to instruct the terminal to switch from the user plane optimization mode to the control plane optimization mode, without the need to reconfigure bearers.

The method of the present embodiment comprises: in S191, the network-side has a small amount of data for transmission, and wishes to switch to the control plane optimization mode for transmission; MME transmits the INITIAL CONTEXT SETUP message to the base station, wherein the message contains instructions to switch to the control plane optimization mode; in S192, the base station transmits the RRCConnectionReconfiguration message to the UE on the downlink Uu interface, wherein the message contains instructions to switch to the control plane optimization mode; in S193, after receiving the transmission, the UE uses the control plane optimization mode to implement data transmission with the network-side.

Embodiment 20

Within the present embodiment, the UE and the network-side both support the control plane optimization mode and the user plane optimization mode. Presently, the UE and the network-side are using the user plane optimization mode; the UE is currently in a connected state; the network-side uses the downlink message to instruct the terminal to release the RRC connection and subsequently switch from the user plane optimization mode to the control plane optimization mode.

The method of the present embodiment comprises: in S2001, the network-side has a small amount of data for transmission, and wishes to switch to the control plane optimization mode for transmission; MME transmits the UE CONTEXT RELEASE message to the base station on the S1 interface, wherein the message contains instructions to switch to the control plane optimization mode; the base station transmits the RRCConnectionRelease message on the Uu interface to the UE, wherein the message contains instructions to switch to the control plane optimization mode; in S2002, after receiving the transmission, the UE releases the current RRC connections and uses the control plane optimization mode to reinitiate an RRC connection for data transmission.

Alternatively, the above method can implement reconfiguration from the control plane optimization mode to the user plane optimization mode.

There are various circumstances of the present disclosure that will not be discussed herein, but which can be derived from the above embodiments.

Figure 7:
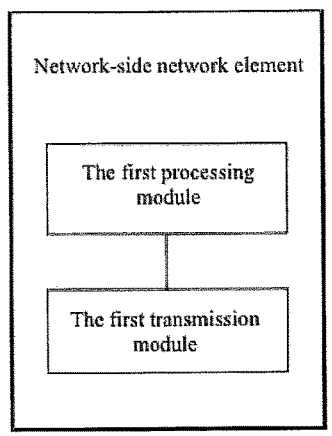
FIG. 7 is an illustration of the data transmission apparatus provided by the present embodiments.

FIG. 7 is a schematic drawing of the data transmission apparatus of the present embodiments; the data transmission apparatus of the present embodiment is configured for the network-side network element (e.g., MME), and comprises: the first processing module, configured to determine the target data transmission mode; and the first transmission module, configured to use the instruction information of the base station transmission to instruct the terminal to switch to the target data transmission mode with which to implement data transmission; wherein, the target data transmission mode is NarrowBand IoT (NB-IoT) data transmission or Long-Term Evolution (LTE) data transmission; the NB-IoT data transmission method comprises: the control plane optimization mode and the user plane optimization mode.

Wherein, the first transmission module is configured to transmit the first downlink message carrying the instruction information to the base station, whereupon the base station transmits the second downlink message carrying the instruction information to the terminal in order to instruct the terminal to switch to the target data transmission mode with which to implement data transmission.

Alternatively, the first downlink message comprises one of the following: paging messages, NAS messages, and AS messages. The second downlink message comprises one of the following: paging messages and RRC messages.

Alternatively, the first processing module is further configured to transmit the data transmission mode support capability information to the terminal, and receive the data transmission mode support capability information of the terminal.

Figure 8:
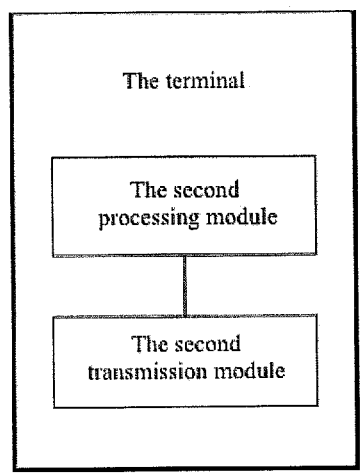
FIG. 8 is another illustration of the data transmission apparatus provided by the present embodiments.
Figure 12:
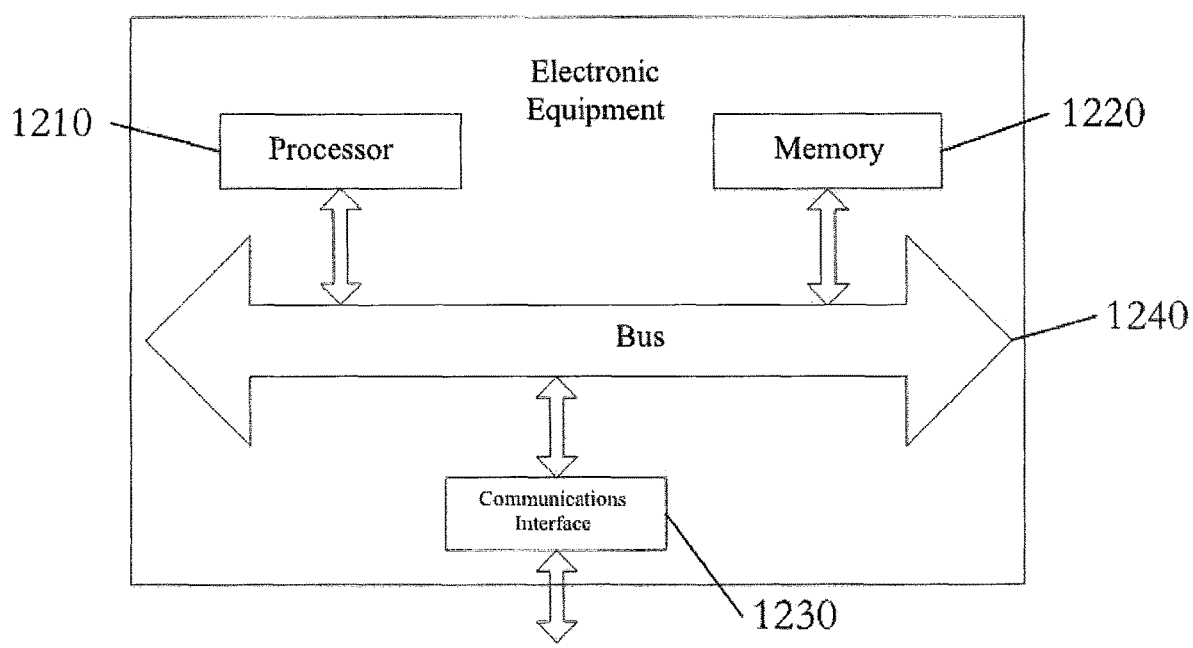

FIG. 8 is another schematic drawing of the data transmission apparatus of the present embodiments. As FIG. 12 shows, the data transmission apparatus of the present embodiment is configured for the terminal, and comprises: the second processing module, configured to determine the target data transmission mode according to the instruction information of the network-side network element; and the second transmission module, configured to use the target data transmission mode to transmit data.

Wherein, the target data transmission mode is Narrow-Band IoT (NB-IoT) data transmission or Long-Term Evolution (LTE) data transmission. The NB-IoT data transmission method comprises: the control plane optimization mode, and the user plane optimization mode.

Alternatively, the second transmission module is further configured to transmit the support capacity information of the terminal for the data transmission mode to the network-side network element, and receive the support capacity information of the network-side network element for the data transmission mode.

Figure 9:
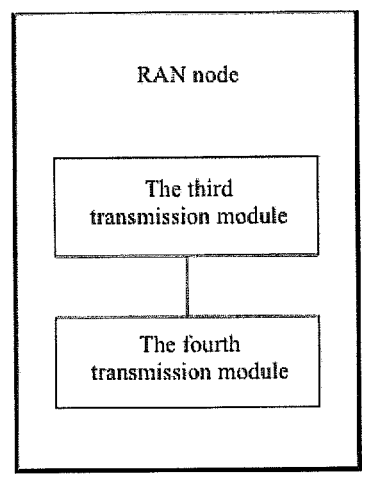
FIG. 9 is another illustration of the data transmission apparatus provided by the present embodiments.

FIG. 9 is another schematic drawing of the data transmission apparatus of the present embodiments. As FIG. 13 shows, the data transmission apparatus of the present embodiments is configured for the RAN node (e.g., the base station), and comprises: the third transmission module, configured to receive the first downlink message carrying instruction information from the core-network network element; the instruction information is used to instruct the terminal to select the target data transmission mode; and the fourth transmission module, configured to transmit the second downlink message carrying the instruction information to the terminal; the terminal selects the target data transmission mode according to the instruction information; wherein, the target data transmission mode is NarrowBand IoT (NB-IoT) data transmission or Long-Term Evolution (LTE) data transmission. The NB-IoT data transmission method comprises: the control plane optimization mode and the user plane optimization mode.

Additionally, the embodiments of the present disclosure further provide a system for data transmission, comprising: the terminal, the network-side network element, and the RAN node. The terminal, the network-side network element, and the RAN node are the same as the apparatus embodiments described above.

Additionally, the process flow of the apparatus and system process described above is the same as the methods described herein, and will not be described further.

Figure 10:
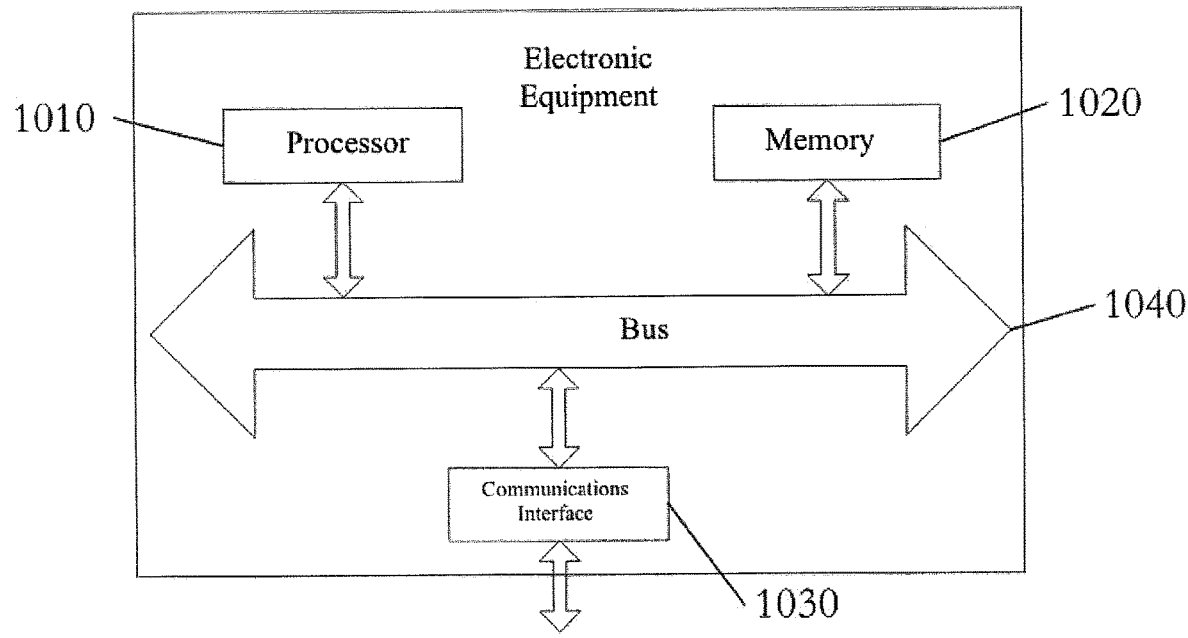
FIG. 10 is a schematic diagram of the network-side network element provided by the present embodiments.

The embodiments of the present disclosure further provide a schematic for the network-side network element; with reference to FIG. 10, the network-side network element comprises: at least one processor 1010; FIG. 10 uses the processor 1010 as an example, as well as the memory 1020, and can also comprise the Communications Interface 1030 and the Bus 1040; wherein, the processor 1010, memory 1020, and the Communications Interface 1030 can achieve mutual communication through the Bus 1040. The Communications Interface 1030 can be used for information transmission. The processor 1010 can transfer the logic instructions stored in the memory 1020 in order to execute the data transmission methods of the network-side network element of the above embodiments.

Additionally, the logic instructions stored in the memory 1020 can take the form of software functional units, which, when sold or used as independent products, can be stored on a computer-readable storage medium.

As a computer-readable storage medium, memory 1020 can be used to store software programs, computer-executable programs and modules, such as the programs/modules corresponding to executing the network-side network element data transmission methods outlined in the present embodiments (e.g., the first processing module and the first transmission module shown in FIG. 7).

By running the software programs, instructions, and modules stored in memory 1020, the processor 1010 executes the functional application and data processing, that is, it achieves the data transmission methods of the network-side network elements described herein.

The memory 1020 can comprise a program storage area and a data storage area, wherein, the program storage area can comprise an operating system and at least one application required by the function; the data storage area can store data created according to the terminal equipment usage, etc. In addition, the memory 1020 can comprise high speed RAM, and may further comprise a non-volatile memory.

The technical solutions of the present disclosure can take the form of computer software products stored in a storage medium, comprising one set or multiple sets of instructions used to make a computer (e.g., a personal computer, a server, or network equipment, etc.) implement all of or a portion of the steps of the methods of the present embodiments. The storage medium can be a non-transitory storage medium, comprising mediums that can store program code such as USB flash disks, portable hard disks, Read-Only Memory (ROM), Random Access Memory (RAM), magnetic disks, or optical disks; it can also be a transient storage medium.

Figure 11:
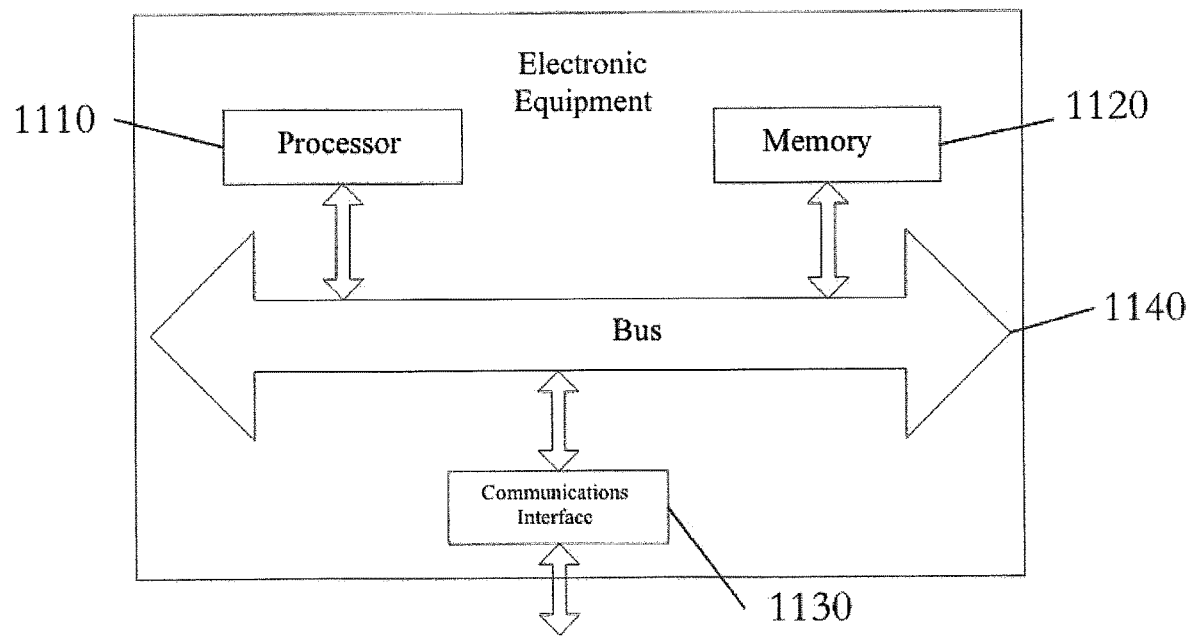
FIG. 11 is a schematic diagram of the terminal provided by the present embodiments; and, FIG. 12 is a schematic diagram of the RAN node provided by the present embodiments.

The embodiments of the present disclosure further provide a schematic for the terminal. With reference to FIG. 11, the terminal comprises: at least one processor 1110; FIG. 10 uses the processor 1110 as an example, as well as the memory 1120, and can also comprise the Communications Interface 1130 and the Bus 1140; wherein, the processor 1110, memory 1120, and the Communications Interface 1130 can achieve mutual communication through the Bus 1140. The Communications Interface 1130 can be used for information transmission. The processor 1110 can transfer the logic instructions stored in the memory 1120 in order to execute the data transmission methods of the terminal of the above embodiments.

Additionally, the logic instructions stored in the memory 1120 can take the form of software functional units, which, when sold or used as independent products, can be stored on a computer-readable storage medium.

As a computer-readable storage medium, memory 1120 can be used to store software programs, computer-executable programs and modules, such as the programs/modules corresponding to executing the network-side network element data transmission methods outlined in the present embodiments (e.g., the second processing module and the second transmission module shown in FIG. 8). By running the software programs, instructions, and modules stored in memory 1120, the processor 1110 executes the functional application and data processing, that is, it achieves the data transmission methods of the terminal described herein.

The memory 1120 can comprise a program storage area and a data storage area, wherein, the program storage area can comprise an operating system and at least one application required by the function; the data storage area can store data created according to the terminal equipment usage, etc. In addition, the memory 1120 can comprise high speed RAM, and may further comprise a non-volatile memory.

The technical solutions of the present disclosure can take the form of computer software products stored in a storage medium, comprising one set or multiple sets of instructions used to make a computer (e.g., a personal computer, a server, or network equipment, etc.) implement all of or a portion of the steps of the methods of the present embodiments. The storage medium can be a non-transitory storage medium, comprising mediums that can store program code such as USB flash disks, portable hard disks, Read-Only Memory (ROM), Random Access Memory (RAM), magnetic disks, or optical disks; it can also be a transient storage medium.

The embodiments of the present disclosure further provide a schematic for the Radio-Access Network (RAN) node. With reference to FIG. 12, the RAN node comprises: at least one processor 1210; FIG. 12 uses the processor 1210 as an example, as well as the memory 1220, and can also comprise the Communications Interface 1230 and the Bus 1240; wherein, the processor 1210, memory 1220, and the Communications Interface 1230 can achieve mutual communication through the Bus 1240. The Communications Interface 1230 can be used for information transmission. The processor 1210 can transfer the logic instructions stored in the memory 1220 in order to execute the data transmission methods of the RAN node of the above embodiments.

Additionally, the logic instructions stored in the memory 1220 can take the form of software functional units, which, when sold or used as independent products, can be stored on a computer-readable storage medium.

As a computer-readable storage medium, memory 1220 can be used to store software programs, computer-executable programs and modules, such as the programs/modules corresponding to executing the network-side network element data transmission methods outlined in the present embodiments (e.g., the third transmission module and the fourth transmission module as shown in FIG. 9). By running the software programs, instructions, and modules stored in memory 1220, the processor 1210 executes the functional application and data processing, that is, it achieves the data transmission methods of the RAN node described herein.

The memory 1220 can comprise a program storage area and a data storage area, wherein, the program storage area can comprise an operating system and at least one application required by the function; the data storage area can store data created according to the terminal equipment usage, etc. In addition, the memory 1220 can comprise high speed RAM, and may further comprise a non-volatile memory.

The technical solutions of the present disclosure can take the form of computer software products stored in a storage medium, comprising one set or multiple sets of instructions used to make a computer (e.g., a personal computer, a server, or network equipment, etc.) implement all of or a portion of the steps of the methods of the present embodiments. The storage medium can be a non-transitory storage medium, comprising mediums that can store program code such as USB flash disks, portable hard disks, Read-Only Memory (ROM), Random Access Memory (RAM), magnetic disks, or optical disks; it can also be a transient storage medium.

Additionally, the embodiments of the present disclosure further provide a non-transitory computer readable storage medium storing computer-executable instructions; the computer-executable instructions are programmed to execute any of the data transmission methods of the network-side network element of the present embodiments.

Additionally, the embodiments of the present disclosure further provide a non-transitory computer readable storage medium storing computer-executable instructions; the computer-executable instructions are programmed to execute any of the data transmission methods of the terminal of the present embodiments.

Additionally, the embodiments of the present disclosure further provide a non-transitory computer readable storage medium storing computer-executable instructions; the computer-executable instructions are programmed to execute any of the data transmission methods of the RAN node of the present embodiments.

It will be apparent to those skilled in the related art that a portion of or all of the steps of the above methods can be completed using a program instructing related hardware (e.g., a processor); the program can be stored on a computer-readable storage medium, such as ROM, magnetic disks, or optical disks. Alternatively, a portion of or all of the steps of the above embodiments can be implemented using an integrated circuit. Accordingly, every module/unit of the above embodiments can be implemented with hardware, such as with an integrated circuit implementing the corresponding function, and can also be implemented with software functional modules, such as with a processor executing the program/instructions stored in memory to implement the corresponding function. The present disclosure is not limited to any particular combination of hardware and software.

The embodiments and descriptions outlined above only serve to explain alternative embodiments of the present disclosure, and do not serve to limit its claims. The present disclosure will undergo various changes and improvements that will fall within the scope and protection of the present claims.

INDUSTRIAL APPLICABILITY

The present disclosure provides a method, apparatus, and system for data transmission. By implementing the embodiments of the present invention, the network-side network element instructs the terminal to switch data transmission modes; by doing so, different transmission modes can be used for different services (e.g., different MTC services), and thus the QoS requirements for different services (such as time-delay requirements, security requirements, and rate requirements) can be satisfied.

What is claimed is:

1. A method performed by a network element, comprising:
   determining a target data transmission mode; and
   transmitting a first message to a wireless communication node, wherein the first message indicates the target data transmission mode and causes the wireless communication node to transmit a second message to a wireless communication device, wherein the second message instructs the wireless communication device to use the target data transmission mode for data transmission,
   wherein the target data transmission mode is a Narrow Band Internet of Things (NB-IoT) data transmission mode comprising a control plane optimization mode and a user plane optimization mode.

2. The method of claim 1, wherein the first message is an Access Stratum (AS) message.

3. The method of claim 1, wherein the second message is a Radio Resource Control (RRC) message.

4. The method of claim 1, wherein the determining is based on a size of transfer data.

5. A method performed by a wireless communication device, comprising:
   receiving a second message transmitted by a wireless communication node, wherein the second message instructs the wireless communication device to use a target data transmission mode for data transmission,
   wherein the second message is transmitted in response to the wireless communication node receiving a first message from a network element, wherein the first message indicates the target data transmission mode, and
   wherein the target data transmission mode is a Narrow-Band IoT (NB-IoT) data transmission mode comprising a control plane optimization mode and a user plane optimization mode.

6. The method of claim 5, wherein the first message is an Access Stratum (AS) message.

7. The method of claim 5, wherein the second message is a Radio Resource Control (RRC) message.

8. The method of claim 5, wherein the target data transmission mode is determined based on a size of transfer data.

9. A method performed by a wireless communication node, comprising:
   receiving a first message transmitted by a network element, wherein the first message indicates a target data transmission mode;
   in response to receiving the first message, transmitting a second message to a wireless communication device, wherein the second message instructs the wireless communication device to use the target data transmission mode for data transmission,
   wherein the target data transmission mode is a Narrow-Band IoT (NB-IoT) data transmission mode comprising a control plane optimization mode and a user plane optimization mode.

10. The method of claim 9, wherein the first message is an Access Stratum (AS) message.

11. The method of claim 9, wherein the second message is a Radio Resource Control (RRC) message.

12. The method of claim 9, wherein the target data transmission mode is determined based on a size of transfer data.

13. A non-transitory computer-readable medium having stored thereon computer-executable instructions for carrying out any one of the methods of claims 1 through 12.

14. A network element, comprising:
- at least one processor configured to determine a target data transmission mode; and
- a transmitter configured to transmit a first message to a wireless communication node, wherein the first message indicates the target data transmission mode and causes the wireless communication node to transmit a second message to a wireless communication device, wherein the second message instructs the wireless communication device to use the target data transmission mode for data transmission,
- wherein the target data transmission mode is a Narrow Band Internet of Things (NB-IoT) data transmission mode comprising a control plane optimization mode and a user plane optimization mode.

15. The network element of claim 14, wherein the first message is an Access Stratum (AS) message.

16. The network element of claim 14, wherein the second message is a Radio Resource Control (RRC) message.

17. The network element of claim 14, wherein the at least one processor is configured to determine the target data transmission mode based on a size of transfer data.

18. A wireless communication device, comprising:
- a receiver configured to receive a second message transmitted by a wireless communication node, wherein the second message instructs the wireless communication device to use a target data transmission mode for data transmission,
- wherein the second message is transmitted in response to the wireless communication node receiving a first message from a network element, wherein the first message indicates the target data transmission mode, and
- wherein the target data transmission mode is a NarrowBand IoT (NB-IoT) data transmission mode comprising a control plane optimization mode and a user plane optimization mode; and
- a transmitter configured to transmit data using the NB-IoT data transmission mode.

19. The wireless communication device of claim 18, wherein the first message is an Access Stratum (AS) message.

20. The wireless communication device of claim 18, wherein the second message is a Radio Resource Control (RRC) message.

21. The wireless communication device of claim 18, wherein the target data transmission mode is determined based on a size of transfer data.

22. A wireless communication node, comprising:
- a receiver configured to receive a first message transmitted by a network element, wherein the first message indicates a target data transmission mode; and
- a transmitter configured to transmit, in response to receiving the first message, a second message to a wireless communication device, wherein the second message instructs the wireless communication device to use the target data transmission mode for data transmission,
- wherein the target data transmission mode is a NarrowBand IoT (NB-IoT) data transmission mode comprising a control plane optimization mode and a user plane optimization mode.

23. The wireless communication node of claim 22, wherein the first message is an Access Stratum (AS) message.

24. The wireless communication node of claim 22, wherein the second message is a Radio Resource Control (RRC) message.

25. The wireless communication node of claim 22, wherein the target data transmission mode is determined based on a size of transfer data.

* * * * *